(12) United States Patent
Tangirala et al.

(10) Patent No.: US 8,965,682 B2
(45) Date of Patent: Feb. 24, 2015

(54) ESTIMATING POSITION AND ORIENTATION OF AN UNDERWATER VEHICLE BASED ON CORRELATED SENSOR DATA

(75) Inventors: Sekhar C. Tangirala, Jupiter, FL (US); Walter K. Feldman, I, Smithtown, NY (US); Christian H. Debrunner, Conifer, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 588 days.

(21) Appl. No.: 13/280,536

(22) Filed: Oct. 25, 2011

(65) Prior Publication Data

US 2012/0101715 A1    Apr. 26, 2012

Related U.S. Application Data

(60) Provisional application No. 61/406,476, filed on Oct. 25, 2010.

(51) Int. Cl.
   *G01C 21/00*  (2006.01)
(52) U.S. Cl.
   CPC .................................. *G01C 21/005* (2013.01)
   USPC ....................................................... 701/408
(58) Field of Classification Search
   USPC .................. 701/400, 408, 412, 445, 468, 523
   See application file for complete search history.

(56) References Cited

U.S. PATENT DOCUMENTS

| 2007/0072662 | A1   | 3/2007  | Templeman |
| 2007/0276590 | A1   | 11/2007 | Leonard et al. |
| 2010/0168949 | A1 * | 7/2010  | Malecki et al. ................ 701/24 |
| 2010/0263948 | A1 * | 10/2010 | Couture et al. ................ 180/8.2 |
| 2012/0099395 | A1   | 4/2012  | Debrunner et al. |
| 2012/0099398 | A1   | 4/2012  | Lichter et al. |
| 2012/0099399 | A1   | 4/2012  | Lichter et al. |

(Continued)

FOREIGN PATENT DOCUMENTS

WO    99/53838    10/1999

OTHER PUBLICATIONS

International Search Report for international application No. PCT/US2011/057606, dated Mar. 9, 2012 (6 pages).

(Continued)

*Primary Examiner* — Kim T Nguyen
(74) *Attorney, Agent, or Firm* — Hamre, Schumann, Mueller & Larson, P.C.

(57) ABSTRACT

A method and system are described that can be used for combining two sources of position and orientation (pose) information where the information from one source is correlated with the information from the other and the sources produce information at differing rates. For example, the method and system allow for estimating position and orientation (pose) of an underwater vehicle relative to underwater structures by combining pose information computed from a 3D imaging sonar with pose information from a vehicle navigation system. To combine the information from the two sources, a determination is made as to whether to generate a forward prediction of the pose estimate of one of the sources relative to the other, and generating the forward prediction if needed. An updated pose of the underwater vehicle is determined based on the fused pose estimate, and which is used for vehicle guidance and control.

10 Claims, 4 Drawing Sheets

(56) References Cited

U.S. PATENT DOCUMENTS

2012/0099400 A1 4/2012 Debrunner et al.
2012/0099402 A1 4/2012 Debrunner et al.

OTHER PUBLICATIONS

Written Opinion of the International Searching Authority for international application No. PCT/US2011/057606, dated Mar. 9, 2012 (5 pages).
Johan Carlström and Ingemar Nygren, "Terrain Navigation of the Swedish AUV62F Vehicle," International Symposium on Unmanned Untethered Submersible Technology, 2005 (10 pages).
Deborah K. Meduna et al., "AUV Terrain Relative Navigation Using Coarse Maps," Proceedings of the 2009 Unmanned Untethered Submersible Technology Conference, located online at http://www.stanford.edu/group/arl/cgi-bin/drupal/sites/default/files/public/publications/MedunaRM%202009.pdf (11 pages).
Peter Kimball and Stephen Rock, "Sonar-Based Iceberg—Relative AUV Localization," UUST: Unmanned Untethered Submersible Technology Conference. 2009. located online at http://www.stanford.edu/group/arl/cgi-bin/drupal/sites/default/files/public/publications/KimballR%202009.pdf (9 pages).
Extended European Search Report for European application No. 11838504.6, dated Dec. 12, 2014 (7 pages).
JC Evans, JS Smith and KM Keller, C21 "Docking Techniques and Evaluation Trials of the Swimmer AUV", Proceedings of IFAC Conference Control Applications in Marine Systems (CAMS 2001), Glasgow, Scotland, Jul. 2001.†
R.K. Hansen et al, "Mosaicing of 3D sonar data sets—techniques and applications", Proceedings of MTS/IEEE Oceans 2005, vol. 3, pp. 2326-2333, Washington DC Sep. 18-23, 2005.†
David Ribas et al., "Underwater SLAM in a Marina Environment", Proceedings of the 2007 IEEE/RSJ International Conference on Intelligent Robots and Systems, pp. 1455-1460, San Diego, CA, USA, Oct. 29-Nov. 2, 2007.†
Evans, J.; Redmond, P.; Plakas, C.; Hamilton, K.; Lane, D, "Autonomous docking for Intervention-AUVs using sonar and video-based real-time 3D pose estimation", Oceans 2003. Proceedings, vol. 4, pp. 2201-2210 vol. 4, Sep. 22-26, 2003.†

\* cited by examiner

ESTIMATING POSITION AND ORIENTATION OF AN UNDERWATER VEHICLE BASED ON CORRELATED SENSOR DATA

This application claims the benefit of priority of U.S. Provisional Application No. 61/406,476, filed on Oct. 25, 2010, and entitled ESTIMATING POSITION AND ORIENTATION OF AN UNDERWATER VEHICLE BASED ON CORRELATED SENSOR DATA, and which is herewith incorporated by reference in its entirety.

FIELD

This disclosure relates to estimating position and orientation of an underwater vehicle with very high accuracy. The estimation is derived by combining a very high accuracy estimate of vehicle position and orientation based on collected sensor data and position and orientation data provided by the vehicle's navigation system. The combined data is also processed to provide an updated position fix to the vehicle's vehicle navigation system, which then updates its estimate of the vehicle's position and orientation.

BACKGROUND

There is a need to have the capability of estimating position and orientation of vehicles in an underwater environment. Oftentimes, there are a number of underwater structures and other equipment around which one might need to navigate with very high precision. Current methods of estimating position and orientation for underwater vehicles include the use of one or more sensors that do not provide the required very high precision measurements.

SUMMARY

A method and system is described that can be used for high precision scanning of underwater structures, to gain a better understanding of underwater structures, such as for example, for the purpose estimating a position and orientation of the underwater vehicle relative to underwater structures. Such estimation of position and orientation is often known as "pose". Such capability can be useful, for example, in directing inspection, repair, and manipulation of the underwater structure.

The method and system herein can be used to scan any type of underwater structure. For example, underwater structures include man-made objects, such as offshore oil platform support structures and piers and oil-well related equipment, as well as natural objects such as underwater mountain ranges. Underwater structure can also include both stationary and non-stationary structures, as well as wholly or partially underwater, for example that may experience drift in the underwater environment. More generally, underwater structure is meant as any arbitrary three dimensional structure with depth variation and that has varying complexity.

As used herein, the term underwater includes any type of underwater environment in which an underwater structure may be located and may need to be scanned using the system described herein, including, but not limited to, salt-water locations such as seas and oceans, and freshwater locations.

Generally, the method and system described herein employ estimates on position and orientation (pose) from two sources. The estimates are combined into a fused estimate which is used to update the position and orientation of the underwater vehicle relative to underwater structures.

In one embodiment, a method of estimating position and orientation of an underwater vehicle includes receiving position and orientation data from one source, and receiving pose data from another source. The data from the one source and the other source are combined, where the combination results in a fused pose estimate. A determination is made on whether to generate a forward prediction of the data received from either the one source or the other source, and the forward prediction is generated if needed. An updated pose of the underwater vehicle is determined based on the fused pose estimate.

In one embodiment, the one source is a vehicle navigation system of the underwater vehicle that is configured to provide an estimate of the pose of the underwater vehicle. In one embodiment, the other source is a sonar based sensor that is configured to provide three dimensional images of underwater structures.

In some embodiments, the estimate of pose derived from the sonar based sensor may be aided by the vehicle navigation system, and thus would be correlated to the estimates derived from the vehicle navigation system. The fusion of these estimates will account for these correlations to provide a current fused estimate of pose, such as for example accounting for the relative frequencies of the two estimates.

In yet another embodiment, it is desirable to have a system, which can carry out the estimation onboard an underwater vehicle. The underwater vehicle is, for example but not limited to, one of an autonomous underwater vehicle (AUV) and a remotely operated underwater vehicle (ROV). As used herein, an ROV is a remotely operated underwater vehicle that is tethered by a cable to a host, such as a surface ship. The ROV is unoccupied and is operated by a pilot aboard the host. The tether can carry, for example, electrical power (in place of or to supplement battery power on the self-contained system), video and data signals back and forth between the host and the ROV. As used herein, an AUV is an autonomous underwater vehicle that is unmanned and is not tethered to a host vessel.

In one embodiment, such a system that estimates pose of an underwater vehicle includes a sensor onboard an underwater vehicle. The sensor is configured to direct an acoustic sonar wave toward an underwater structure, where the reflected acoustic sonar wave is processed to provide three dimensional images of underwater structures and to provide an image sensor-based pose estimate of pose. A vehicle navigation system is onboard the underwater vehicle. The vehicle navigation system is configured to provide an estimate of pose of the underwater vehicle. The imaging sensor-based pose estimate provided by the processing of the sonar sensor acoustic wave is correlated with the estimate provided by the vehicle navigation system through the aiding provided by the vehicle navigation system. A data storage is onboard the underwater vehicle is configured to receive the imaging sensor-based pose estimate.

A data processor is onboard the underwater vehicle. The data processor is configured to receive both the imaging sensor-based pose estimate from the processed sonar sensor acoustic wave and the pose estimate from the vehicle navigation system. The processor is configured to combine the estimate provided by the sensor and the estimate provided by the vehicle navigation system, the combination resulting in a fused pose estimate. The processor also is configured to determine whether to generate a forward prediction of the image sensor-based pose estimate, and is configured to generate the forward prediction if needed. The processor is configured to determine an updated pose estimate of the underwater vehicle based on the fused pose estimate. The processor is also configured to provide a fused position fix to the vehicle navigation system and determine when to provide this position fix as a reset to the vehicle navigation system.

DRAWINGS

DETAILED DESCRIPTION

Method of Estimating Pose of an Underwater Vehicle

Figure 1:
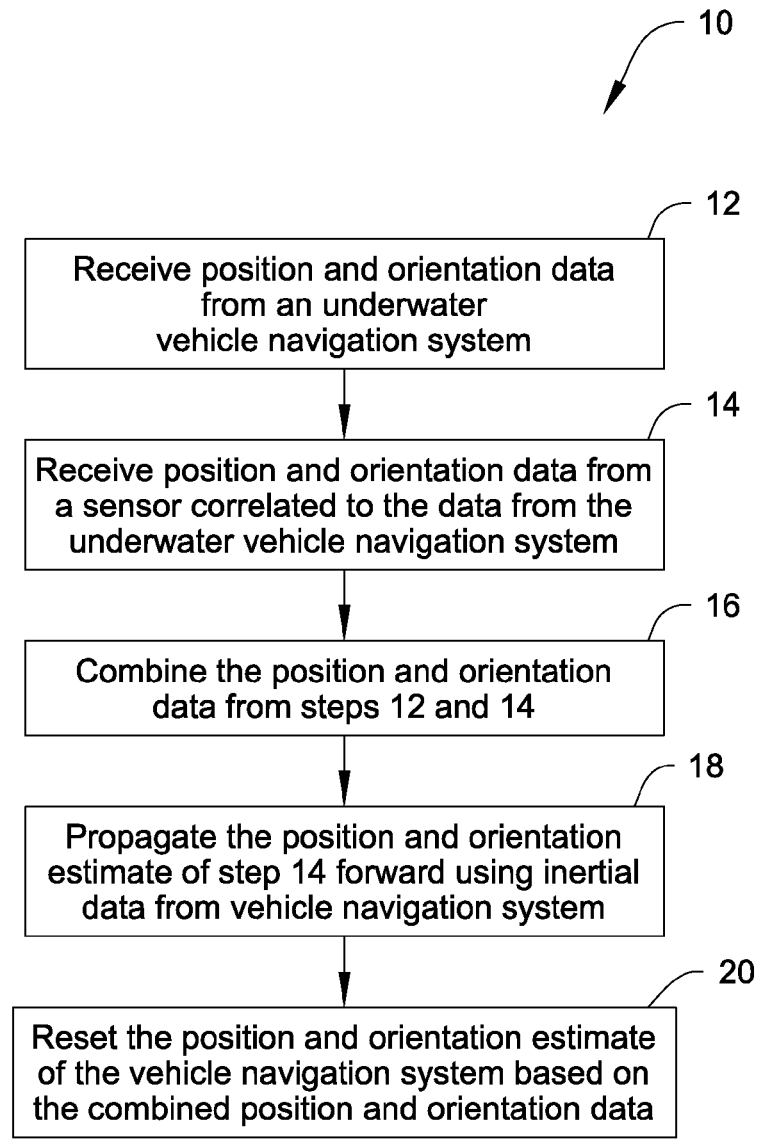
FIG. 1 shows a flow diagram of one embodiment of a method for estimating pose of an underwater vehicle.

FIG. 1 shows a flow diagram of one embodiment of a method 10 for estimating the pose of an underwater vehicle. In general, the method is carried out by using an underwater vehicle's navigation capability along with a feature based sensor such as an image sensor, e.g. sonar imaging sensor, and a processor that updates the estimated pose of the underwater vehicle. In many circumstances, the estimation can be performed onboard an underwater vehicle and in real time, such as for example by using suitable commercial off the shelf embedded hardware and software.

The method 10 includes receiving pose data from an underwater vehicle navigation system 12, such as for example an aided or unaided vehicle navigation system. Estimated pose data is received from a sensor that is correlated to the estimated pose data from the underwater vehicle navigation system 14.

In one embodiment, the data received from the sensor at step 14 includes directing an acoustic sonar wave toward an underwater structure. After directing the acoustic sonar wave, a reflected acoustic sonar response is received from the underwater structure. In one embodiment, for example in three dimensional (3D) imaging sonar, the acoustic sonar wave is processed to produce a three dimensional image. The 3D imaging sonar can be any 3D sonar that creates a 3D image from a single outgoing acoustic sonar wave or ping. An example of a suitable 3D sonar is the CodaOctopus Echoscope available from CodaOctopus Products. It will be appreciated that the 3D sonar can be adjusted and arranged such that it points toward an underwater structure, so that it can send a ping(s) at the underwater structure and can be oriented at a various desired angles relative to vertical, and various viewpoints and distances from the underwater structure.

It will be appreciated that vehicle navigation systems are known, and are used to determine the position, orientation, and velocity (e.g. direction and speed of movement) of the underwater vehicle. In some examples, the vehicle navigation system is an inertial navigation system (INS). A vehicle navigation system can include a doppler velocity log (DVL) unit that faces downward for use in determining velocity, but it will be appreciated that a vehicle navigation system can be any system that can determine position, orientation, and velocity (e.g. direction and speed of movement). An example of a suitable vehicle navigation system is the SeaDeVil available from Kearfott Corporation, may include for example, a Teledyne RDI DVL (Doppler velocity log).

The vehicle navigation system produces a vehicle navigation system pose estimate and the 3D sonar sensor produces an imaging sensor-based pose estimate. Generally, the method includes combining the estimates from the vehicle navigation system and the 3D sonar sensor to provide a fused pose estimate from the two sources 16. Where appropriate and/or needed, the fused estimate is used to periodically correct drift in the vehicle navigation system at some period determined by the correlation time between the sensor based pose estimate and the vehicle navigation system's position estimate. Such a position fix is available at a high rate from the fusion process, and is applied to the vehicle navigation system, such as for example to reset at a lower rate determined by the auto correlation of the fused estimate.

In one embodiment, the fusion is accomplished by using a Bayesian Combiner which is configured to operate on the latest feature based pose estimate, such as an image sensor-based pose estimate, propagated forward to a time corresponding to the latest available pose estimate from the vehicle navigation system, such as for example an inertial pose from an INS. Thus, the estimate from the 3D sonar sensor (or image sensor) can be adjusted 18 to be applicable to the current time. See also FIG. 4.

Figure 4:
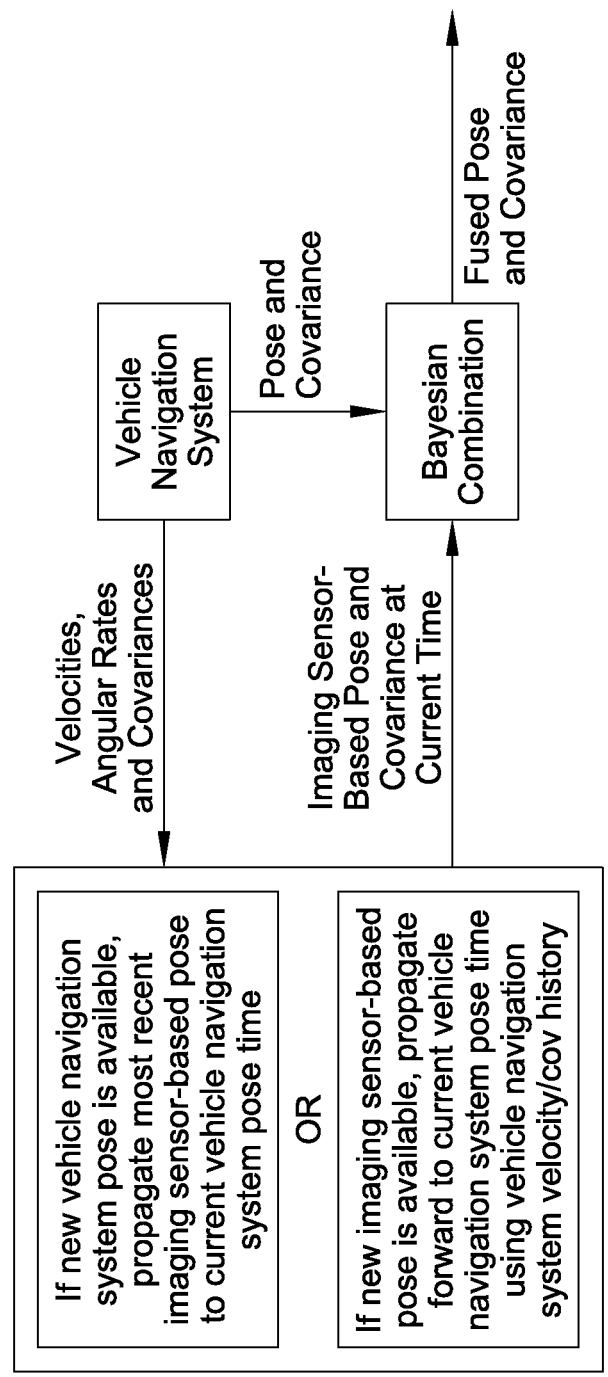
FIG. 4 shows an example of forward propagation of the pose obtained from a feature based sensor, such as an image sensor.

With reference to FIG. 4, a pose obtained from an image sensor, e.g. pose from 3D sonar, can be propagated forward such as for example by a processor used in the system. As shown, if a new vehicle navigation system pose is available, the most recent image sensor-based pose can be propagated to the current vehicle navigation system pose time. See box at the left side of FIG. 4. The propagated pose is then input into a combiner (see box at the right side of FIG. 4), such as a Bayesian combiner. See arrow of image sensor-based Pose and Covariance at current time. The vehicle navigation system pose and covariance are also input into the combiner, where the vehicle navigation system pose and image sensor-based pose are then combined into a fused pose with covariance.

With further reference to FIG. 1, based on the combined estimates and adjustment 18, if needed, the pose of the underwater vehicle can be updated and reset 20, which can be useful for vehicle guidance and control and as an initial condition for future image sensor-based navigation.

Figure 2:
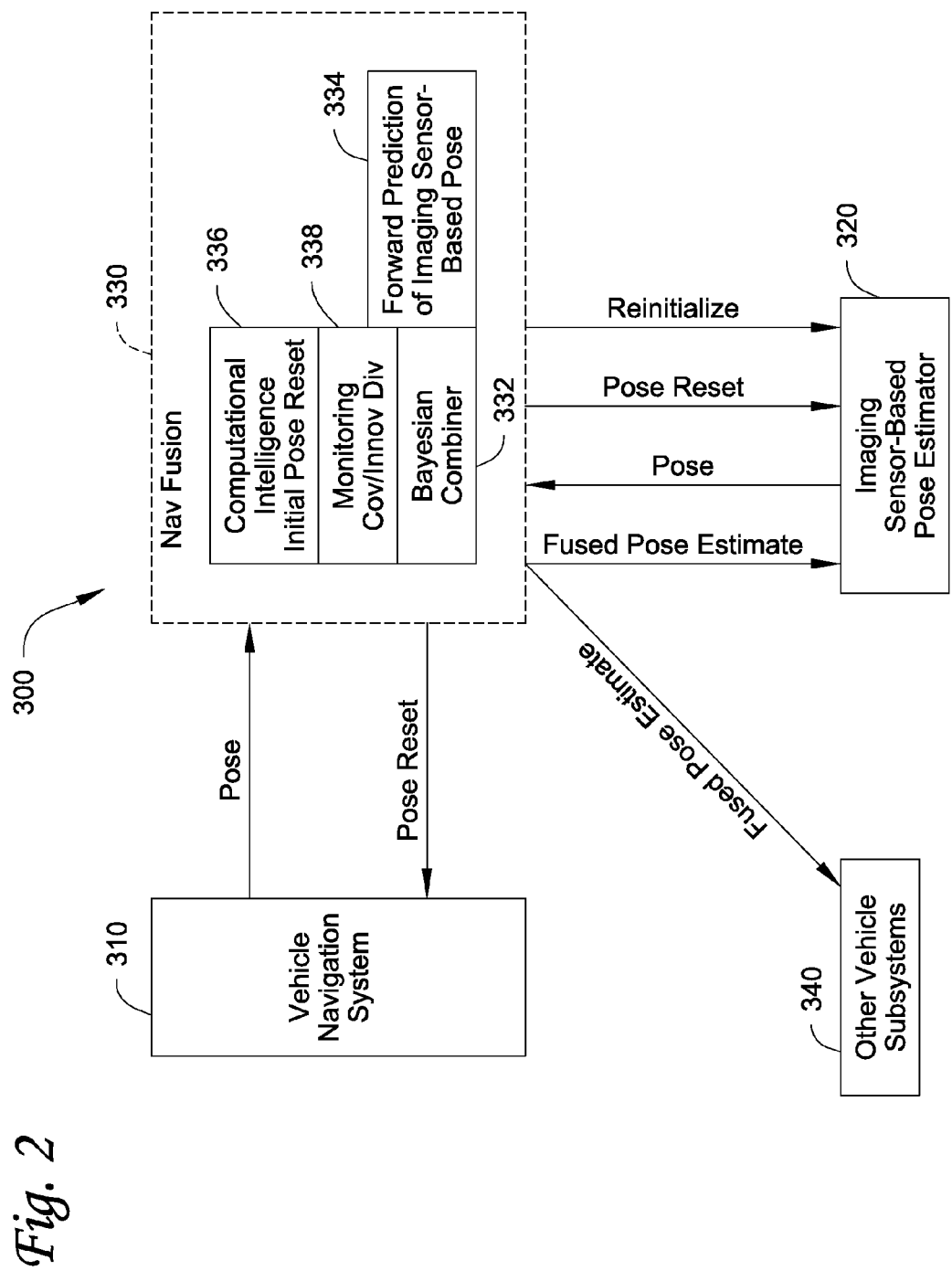
FIG. 2 shows a flow diagram of one embodiment for processing sensor data correlated to the vehicle navigation system data and processing pose data from the vehicle navigation system.

FIG. 2 shows a flow diagram 300 of one embodiment for processing sensor data correlated to the vehicle navigation system data and processing position orientation data from the vehicle navigation system.

As shown, a vehicle navigation system 310 provides pose data to a processing unit 330 or Nav Fusion. The vehicle navigation system 310 provides an estimate of pose for the underwater vehicle. Likewise, in the perception block, a pose sensor 320 such as a 3D sonar sensor, provides pose data to the Nav block 330. The sensor 320 provides an image sensor-based estimate of the pose of the underwater vehicle. As shown, the sensor 320 is dependent upon estimated pose data provided by the Nav Fusion 330, and therefore its estimated pose data is correlated to the data from the vehicle navigation system 310.

With further reference to the Nav block 330, further processing of the estimates from the vehicle navigation system 310 and sensor 320 are performed. The estimates are combined at block 332. In the embodiment shown, a Bayesian Combiner such as described above is used to combine or fuse the estimates. The combiner is configured to operate on the latest image sensor-based pose estimate (e.g. from sensor 320), propagated forward to the time of the latest available vehicle navigation system 310 pose estimate. It will be appreciated that the combiner includes an algorithm that weights the sensor-based pose and vehicle navigation system estimated pose based on estimates of the errors in each of these sensors.

With further reference to forward propagation, block 334 shows further processing of the estimate from the sensor 320 with a forward prediction so that it can be fused with the latest available vehicle navigation system 310 pose estimate. Oftentimes, the vehicle navigation system 310 pose estimate and the sensor 320 pose estimate are different data flows that come to the Nay 330 at different frequencies and times, thus, forward propagation of one is needed for fusion to be completed. For example, the sensor estimate may be at a frequency of about 5 Hz and the vehicle navigation system pose estimate may be at a frequency of 20 Hz. Thus, at block 334 the sensor pose estimate is propagated forward so that it may be fused with the vehicle navigation system pose estimate.

At block 336, error or failure detection processing may be employed. As the incoming pose estimate from sensor 320 may be susceptible to error, it may be helpful to cross reference it with the most current fused pose estimate. If the uncertainty of the incoming sensor estimate is over a certain threshold, or if its deviation from the fused pose estimate is over a certain threshold, the sensor 320 can be reinitialized to perform additional processing to generate another pose estimate that is more accurate. This is called monitoring the covariance and innovations divergence, e.g. from the currently accepted pose estimate.

Once the estimates are combined, the pose of the underwater vehicle can be updated. Further processing at block 336 shows that the vehicle navigation system pose estimate can be periodically reset based on fused pose estimates. As the data from the sensor 320 is to be coordinated with the vehicle navigation system for fusion, it will be appreciated that when the vehicle navigation system is reset, the sensor 320 is informed of such a reset.

In some embodiments such as shown in block 340, a response (reset) 340 may be sent to the underwater vehicle to react to the updated state provided by the Nay block 330.

With further reference to the pose sensor correlated to the navigation system (e.g. such as a 3D sonar sensor), estimation of pose using such 3D sonar sensors has been described in copending provisional applications having the following reference information: —titled ESTIMATING POSITION AND ORIENTATION OF AN UNDERWATER VEHICLE RELATIVE TO UNDERWATER STRUCTURES; —titled DETECTING STRUCTURAL CHANGES TO UNDERWATER STRUCTURES; and —titled BUILDING A THREE DIMENSIONAL MODEL OF AN UNDERWATER STRUCTURE, all of which were filed concurrently with this application on Oct. 25, 2010 as provisional applications with respective Ser. Nos. 61/406,424, 61/406,435, and 61/406,444, and all of which are incorporated herewith by reference in their entirety.

System of Estimating Pose of an Underwater Vehicle

It will be appreciated that the methods of estimating a position and orientation (pose) of an underwater vehicle herein may be provided in an autonomous system onboard an underwater vehicle. In some embodiments, the underwater vehicle is an autonomous underwater vehicle with the appropriate processing capability to estimate pose in real time. However, it will be appreciated that the system may wholly or partially be onboard other vehicles, such as for example an ROV or a manned sea vessel.

In one embodiment, the system includes a 3D sonar sensor and a vehicle navigation system, along with suitable processing capability to carry out model building of underwater structures or imaging sensor-based structure inspections.

Figure 3:
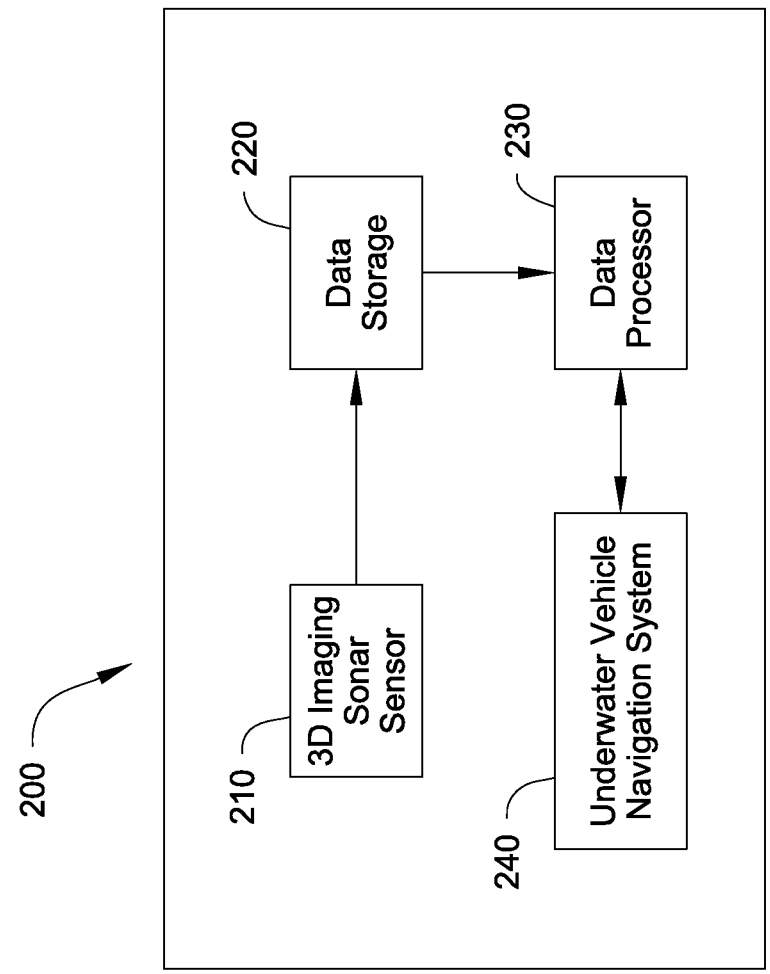
FIG. 3 shows a schematic of a system for estimating a pose of an underwater vehicle.

FIG. 3 shows a system 200 for estimating a pose of an underwater vehicle. In appropriate circumstances, the system 200 is onboard and part of an underwater vehicle and has real time processing capability, for example estimating pose in about one second and sometimes less.

In the embodiment shown, a 3D imaging sonar sensor 210 can electrically transmit a response from a 3D sonar ping to a data storage 220. In one embodiment, the sensor is onboard an underwater vehicle. The sensor 210 is configured to direct an acoustic sonar wave toward an underwater structure, where the acoustic sonar wave reflected from the structure is processed by the sensor to produce a three dimensional image and an estimate of the vehicle pose. The data storage 220 is configured to receive a response from the sensor 210, where the response can provide an image sensor-based pose estimate of pose. In one embodiment, the data storage 220 is onboard the underwater vehicle.

In one embodiment, the underwater vehicle navigation system 240 includes a vehicle navigation system that provides an estimation of pose to a data processor 230 onboard the underwater vehicle.

The processor 230 is configured to receive the image sensor-based pose estimate and the estimate from the vehicle navigation system. In one embodiment, the data processor 230 is onboard the underwater vehicle. The data processor 230 is configured to receive both the image sensor-based pose estimate 210 and the pose estimate from the vehicle navigation system 240, and is configured to combine the image sensor-based pose estimate provided by the sensor and the pose estimate provided by the vehicle navigation system. The combination results in a fused pose estimate. The processor 230 is configured to determine whether to generate a forward prediction of the image sensor-based pose estimate, and is configured to generate the forward prediction if needed. And the processor 230 is configured to determine an updated pose of the underwater vehicle based on the fused pose estimate.

It will be appreciated that the components of the system 200 can be powered by the underwater vehicle.

The methods and systems described herein above can be used to estimate and update a pose of an underwater vehicle, relative to underwater structures. Such applications can include, but are not limited to, subsea structure inspection and repair in both commercial and military settings, harbor inspection, and mine detection and/or countermeasures. In one embodiment, data from 3D sonar scans is collected, data from vehicle navigation system is collected, and the data is logged and processed. In general, the data is fused to generate a fused pose, which can obtain a very high level of accuracy, such as within a cubic foot or within cubic centimeters. The collection, logging and processing of the data can be performed using the data processing electronics onboard the underwater vehicle, with real time processing capability.

Such a method and system for estimating pose as described herein can be useful when inspecting for damage, deformation of underwater structures. The methods and systems described herein above can be useful, for example, in situations where an underwater vehicle is far from the seafloor, for example over 1000 meters, such that other navigation aids, such as DVL are unavailable. It will be appreciated that the methods and systems described herein are applicable to non-inertial underwater vehicle navigation systems such as those containing a magnetic compass and speed-through-the-water reference. It will also be appreciated the methods and systems described herein can avoid the need for additional image-based sensors. It will also be appreciated that non-stationary underwater structures may also be examined using the methods and systems herein. The use of 3D sonar allows scanning of complex 3D structures to provide full depth images and pose estimates with a full six degrees of freedom.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of estimating position and orientation of an underwater vehicle comprising:
   receiving, by a processor, pose data from one source, the one source being a vehicle navigation system;
   receiving, by a processor, pose data from another source being an image sensor-base source different from the vehicle navigation system;
   determining a fused pose estimate using a processor, the determining comprising determining a forward prediction of the pose data received from the image sensor-based source based on a forward propagation of the pose data from the image sensor-based source relative to the pose data from the vehicle navigation system and combining, using a processor, the pose data from the vehicle navigation system and the forward prediction of the pose data from the image sensor-based source, the combination resulting in the fused pose estimate; and
   estimating, using a processor, an updated pose of the underwater vehicle based on the fused pose estimate.

2. The method of claim 1, wherein the vehicle navigation system is an inertial navigation system of the underwater vehicle that is configured to provide an estimate of the pose of the underwater vehicle.

3. The method of claim 1, wherein the image sensor-based source is a three dimensional sonar based sensor that is configured to provide a three dimensional image of an underwater structure and an estimate of the pose of the underwater vehicle.

4. The method of claim 1, wherein the step of estimating an updated pose comprises correcting drift in the vehicle navigation system, the correcting drift occurring at a period determined by a correlation time of the fused pose estimate.

5. The method of claim 1, further comprising reinitializing the image sensor-based source, using a processor, to generate a different pose data that is more accurate and consistent with a current fused pose estimate, the reinitializing comprises performing failure detection processing.

6. The method of claim 1, further comprising resetting a pose of the vehicle navigation system, using a processor, based on the fused pose estimate.

7. The method of claim 1, wherein the underwater vehicle is one of an autonomous underwater vehicle or a remotely operated vehicle.

8. The method of claim 1, further comprising correlating, using a processor, the pose data from the image sensor-based source with the pose data front the vehicle navigation system.

9. A system for estimating position and orientation of an underwater vehicle comprising:
   a sensor onboard an underwater vehicle, the sensor is configured to direct toward an underwater structure an acoustic sonar wave to be reflected back to be the sensor, and configured to receive the reflected acoustic sonar wave to be processed to produce an image sensor-based pose estimate;
   a vehicle navigation system onboard the underwater vehicle, the vehicle navigation system is configured to provide an estimate of pose of the underwater vehicle
   a data storage onboard the underwater vehicle that is configured to receive the image sensor-based pose estimate; and
   a data processor onboard the underwater vehicle, the data processor is configured to receive both the image sensor-based pose estimate and the estimate of pose from the vehicle navigation system,
   the data processor is configured to determine a fused pose estimate, the fused pose estimate is determined by the data processor being configured to determine a forward prediction of the image sensor-based pose estimate based on a forward propagation of the image sensor-based pose estimate relative to the estimate of pose from the vehicle navigation system, and being configured to combine the estimate of pose from the vehicle navigation system and the forward prediction of the image sensor-based pose estimate, where the combination results in the fused pose estimate, and
   the data processor is configured to estimate an updated pose of the underwater vehicle based on the fused pose estimate.

10. The system of claim 9, wherein the image sensor-based pose estimate provided by the sensor is correlated with the pose estimate provided by the vehicle navigation system.

* * * * *

UNITED STATES PATENT AND TRADEMARK OFFICE
CERTIFICATE OF CORRECTION

PATENT NO.         : 8,965,682 B2
APPLICATION NO.    : 13/280536
DATED              : February 24, 2015
INVENTOR(S)        : Tangirala et al.

Page 1 of 1

It is certified that error appears in the above-identified patent and that said Letters Patent is hereby corrected as shown below:

On the title page item 75, after Walter K. Feldman,: delete "I,".

In the specification

Column 1, line 21: delete "vehicle's vehicle navigation system" and insert --vehicle's navigation system--.

Column 5, line 10: delete "Nay 330" and insert --Nav 330--.

Column 5, line 38: delete "Nay 330" and insert --Nav 330--.

In the claims

Column 7, line 15: delete "sensor-base" and insert --sensor-based--.

Column 8, line 9: delete "front" and insert --from--.

Column 8, line 15: delete "sonar wave to be reflected back to be the sensor," and insert --sonar wave to be reflected back to the sensor,--.

Column 8, line 21: after "vehicle" insert --;--.

Signed and Sealed this
First Day of March, 2016

Michelle K. Lee
*Director of the United States Patent and Trademark Office*